(12) United States Patent
Cha et al.

(10) Patent No.: US 12,736,995 B2
(45) Date of Patent: Sep. 15, 2026

(54) PEDAL SIMULATOR OF VEHICLE

(71) Applicant: HYUNDAI MOBIS CO., LTD., Seoul (KR)

(72) Inventors: Myeon Gyu Cha, Yongin-si (KR); Jin Hyun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 575 days.

(21) Appl. No.: 18/223,644

(22) Filed: Jul. 19, 2023

(65) Prior Publication Data

US 2024/0143016 A1 May 2, 2024

(30) Foreign Application Priority Data

Oct. 28, 2022 (KR) ........................ 10-2022-0141227

(51) Int. Cl.
*B60T 7/04* (2006.01)
*B60T 7/06* (2006.01)
*G05G 5/03* (2008.04)

(52) U.S. Cl.
CPC ................ *G05G 5/03* (2013.01); *B60T 7/042* (2013.01); *B60T 7/06* (2013.01); *B60T 2220/04* (2013.01); *G05G 2505/00* (2013.01)

(58) Field of Classification Search
CPC .......... B60T 8/409; B60T 7/042; B60T 7/046; B60T 2220/04; B60T 13/74–748; B60T 2270/082; G05G 5/03; G05G 2505/00; B60Y 2400/81
See application file for complete search history.

(56) References Cited

U.S. PATENT DOCUMENTS

2023/0409070 A1* 12/2023 Kim .......................... B60T 7/06

FOREIGN PATENT DOCUMENTS

DE 102007030312 A1 * 1/2009 .............. B60T 7/042
KR 10-2005-0035342 A 4/2005
KR 10-2223847 B1 3/2021
KR 10-2022-0036483 A 3/2022

* cited by examiner

*Primary Examiner* — David R Morris
(74) *Attorney, Agent, or Firm* — Morgan, Lewis & Bockius LLP

(57) ABSTRACT

A pedal simulator of a vehicle includes a housing unit, a piston unit slidably mounted on the housing unit, a rotation unit rotatably coupled to the housing unit, and a first damper unit disposed in a plurality of rotation units and compressed by a pressure of the piston unit inside the housing unit.

19 Claims, 9 Drawing Sheets

1
200
220
210
240
230
520
540
550
532
531
530
510
120
100
110
400
320
311
310
300
330

200

PEDAL SIMULATOR OF VEHICLE

CROSS-REFERENCE TO RELATED APPLICATION

This application claims the benefit under 35 U.S.C. § 119(a) of priority to Korean Patent Application No. 10-2022-0141227, filed on Oct. 28, 2022 in the Korean Intellectual Property Office, the entire disclosure of which is incorporated herein by reference for all purposes.

BACKGROUND

Field

Exemplary embodiments of the present disclosure relate to a pedal simulator of a vehicle, and more particularly, the pedal simulator of the vehicle capable of providing a braking feeling.

Discussion of the Background

A pedal simulator is a component mounted on an electro mechanical brake or an electronic booster (VEB) and provides a driver with a braking feeling generated by conventional mechanical (hydraulic) brakes.

A hydraulic system is applied to conventional electronic brakes. However, as technologies related to electric brake systems and autonomous vehicles have recently emerged, a development of non-hydraulic brake devices is required.

According to optional specifications applied to each type of vehicle, the pedal simulator with a suitable braking feeling is installed. In conventional technology, even when a driving mode of the vehicle is changed, the same braking feeling is implemented, so there is a problem that is not capable of providing various braking feelings required by the driver.

The related art of the present disclosure is disclosed in Korea Registered Patent Publication No. 10-2223847 (published on Mar. 8, 2021 and entitled 'PEDAL SIMULATOR').

SUMMARY

An object of the present disclosure devised to solve the above-described problems is to provide a pedal simulator apparatus of a vehicle capable of implementing various braking feelings.

In addition, the object of the present disclosure is to provide the pedal simulator apparatus of the vehicle capable of improving an effective stroke, an invalid stroke, and a braking feeling.

In an embodiment, the present disclosure devised to achieve the above problem is a pedal simulator apparatus of a vehicle, and includes a housing unit, a piston unit which is slidably disposed on the housing unit, a rotation unit which is rotatably coupled to the housing unit, and a plurality of first damper units which are disposed in the rotation unit and are compressed by a pressure of the piston unit inside the housing unit.

The pedal simulator apparatus of the vehicle may further include a second damper unit, which is accommodated inside the housing unit, disposed to be spaced apart from the first damper unit, and configured to be compressed by the pressure of the piston unit.

The piston unit may include a piston body unit located outside the housing unit; a piston pressing unit provided on a first side of the piston body unit; a first piston rod unit, which is provided on a second side of the piston body unit and configured for pressing one of the plurality of the first damper units; and a second piston rod unit, which is provided on the second side of the piston body unit, is disposed to be spaced apart from the first piston rod unit, and configured for pressing the second damper unit.

The piston pressing unit may be rotatably coupled to the piston body unit.

The first piston rod unit and the second piston rod unit may be formed in different lengths.

The first damper unit located inside the housing unit may be disposed opposite the first piston rod unit, and the second damper unit may be disposed opposite the second piston rod unit.

The second damper unit may include a damper body unit mounted on the housing unit; a damper contact unit disposed to be spaced apart from the damper body unit and being in contact with the second piston rod unit; a connection unit which a first side thereof is movably mounted on the damper body unit, and a second side thereof is mounted on the damper contact unit; a magnet unit mounted on the damper body unit and configured for measuring location information of the second piston rod unit; and an elastic unit which a first side thereof is in contact with the damper body unit, a second side thereof is in contact with the damper contact unit, and providing elasticity to the damper contact unit moved by the second piston rod unit.

The connection unit may include; a connection block unit which is movably mounted on the damper body unit; and a connection rod unit which a first side thereof is mounted on the connection block unit, and a second side thereof is mounted on the damper contact unit.

The rotation unit may include: a main body unit equipped with a plurality of groove units formed by depression on an outer surface thereof to accommodate the plurality of the first damper units; and a rotating shaft provided on the outer surface of the main body unit and coupling to an inner side of the housing unit.

The pedal simulator apparatus of the vehicle may further include a rotating unit located outside the housing unit, engaging with an outer periphery edge of the main body unit, and rotating the main body unit.

The plurality of groove units may be disposed to be spaced apart along a circumferential direction of the main body unit.

The plurality of groove units may be disposed to be spaced apart from the center of the rotating shaft at a same interval.

The plurality of the first damper units may include an elastic material.

The plurality of the first damper units may have different hardness.

The plurality of the first damper units may be formed in different lengths.

The present disclosure may rotate a plurality of first damper units on a single pedal simulator apparatus, thereby having an effect of implementing various braking feelings in a single vehicle.

In addition, in the present disclosure, the first piston rod unit and the second piston rod unit are formed in different lengths, there is an effect capable of being tuned in such a manner as to feel an early and mid-term braking feeling suitable for the user and a late-term braking feeling.

In addition, the present disclosure has an effect of reducing the volume of the housing unit through a parallel structure of the first piston rod unit, the second piston rod unit, and the first damper unit and the second damper unit.

DETAILED DESCRIPTION OF THE ILLUSTRATED EMBODIMENTS

Figure 1:
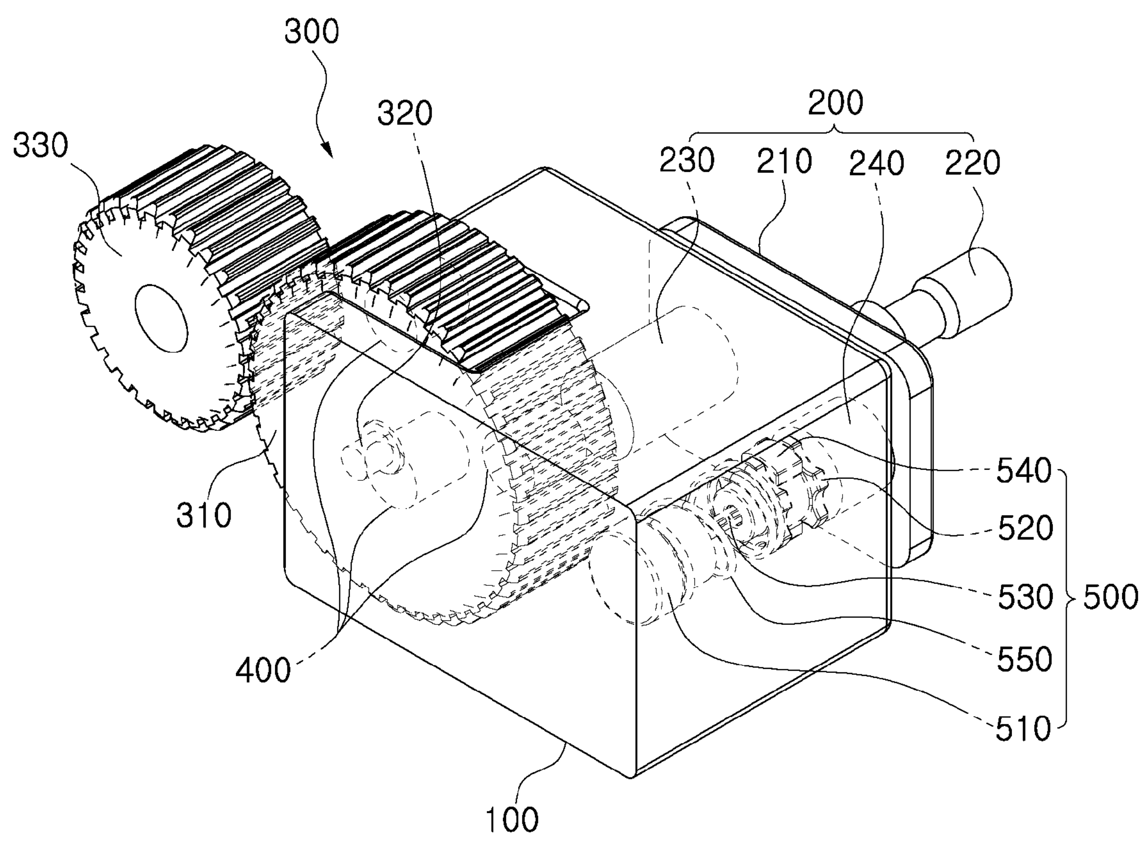
FIG. 1 is a perspective view illustrating a pedal simulator of a vehicle according to an embodiment of the present disclosure.

Hereinafter, a pedal simulator of a vehicle will be described below with reference to the accompanying drawings through various exemplary embodiments. For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

Figure 2:
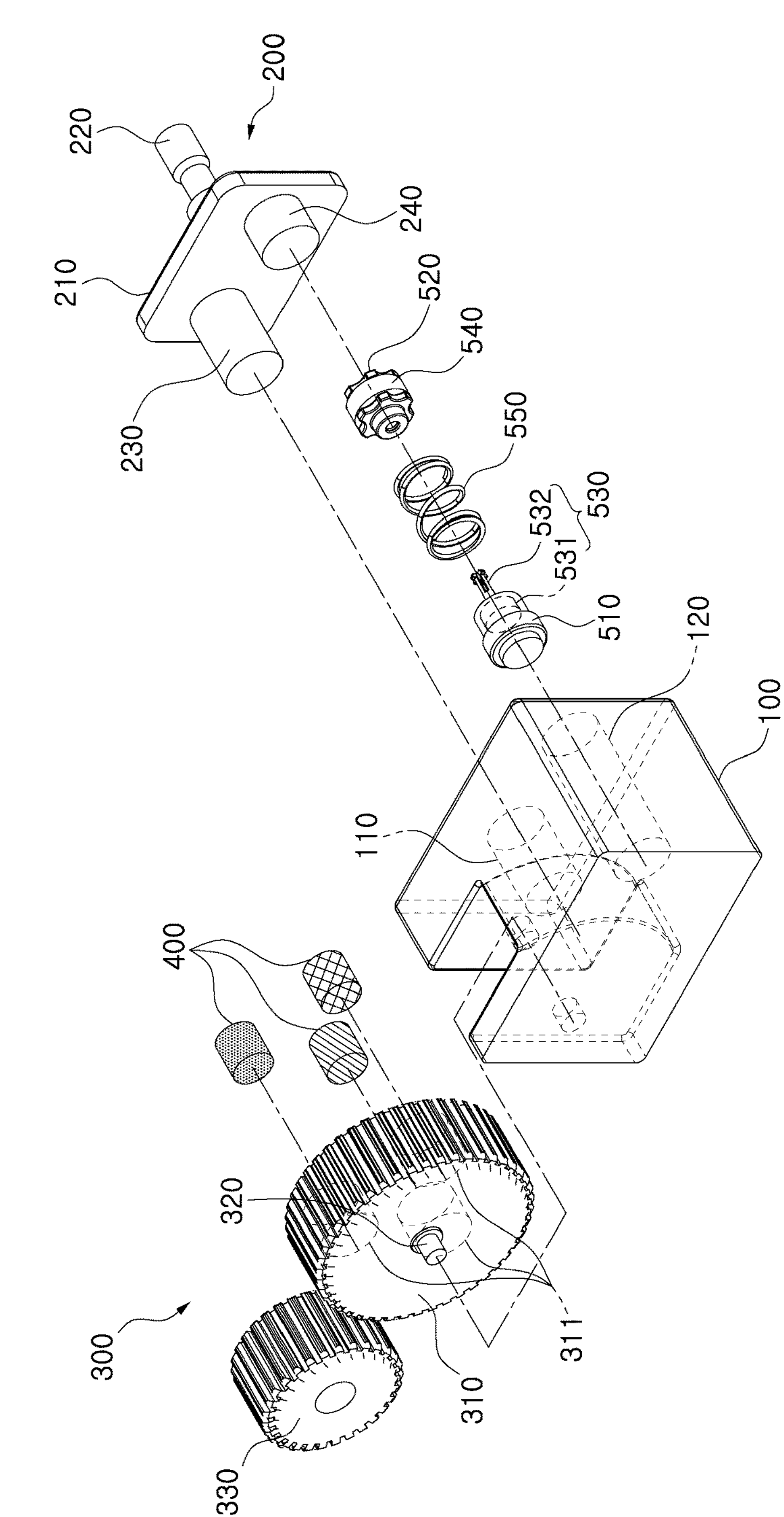
FIG. 2 is an exploded perspective view of FIG. 1.
Figure 3:
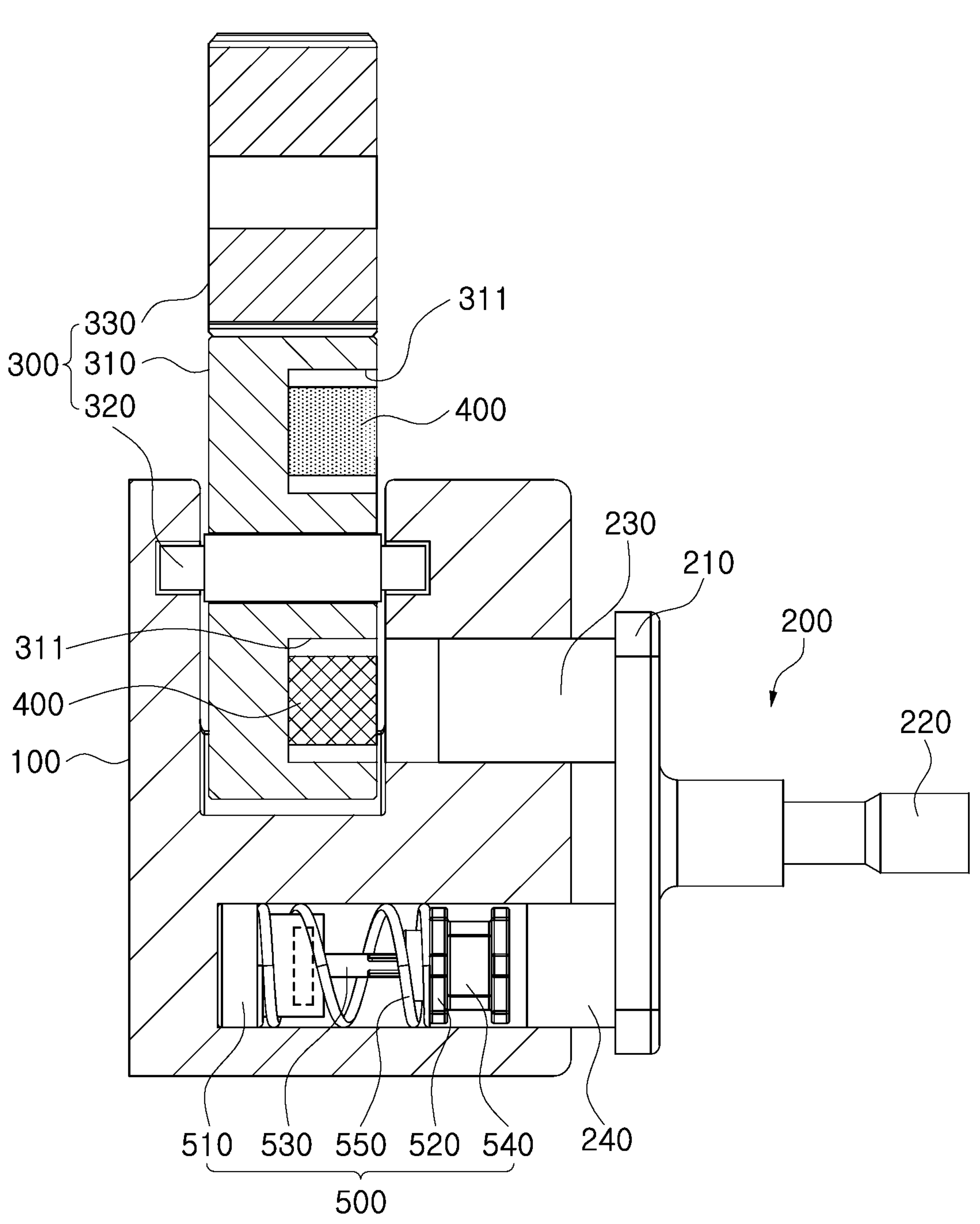
FIG. 3 is a cross-sectional view of FIG. 1.
Figure 4:
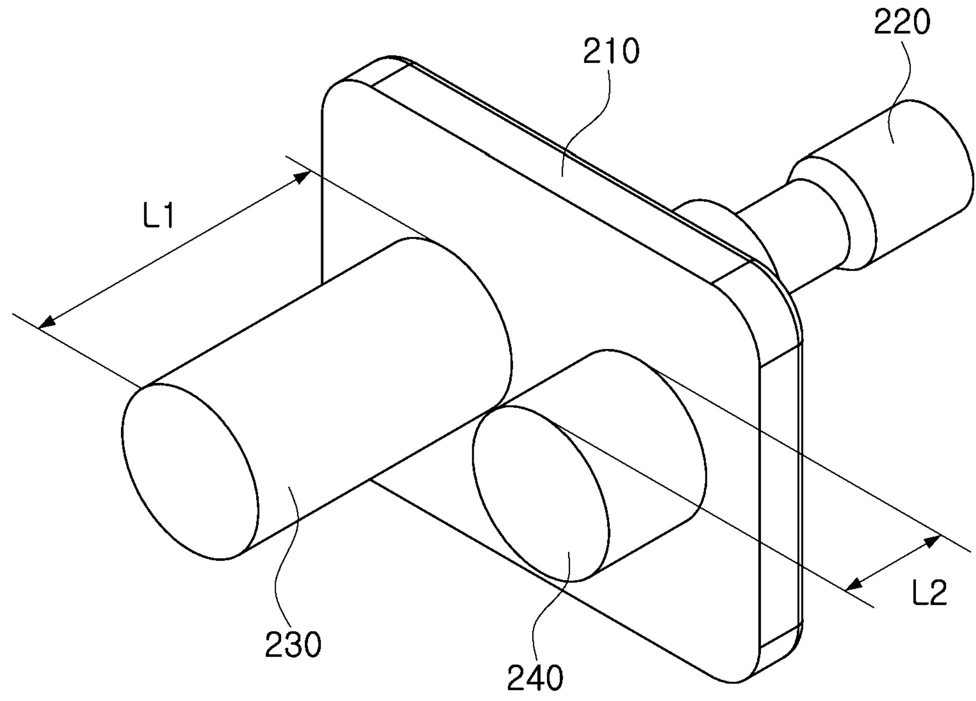
FIG. 4 is a perspective view illustrating a piston unit of the pedal simulator of the vehicle according to the embodiment of the present disclosure.
Figure 5:
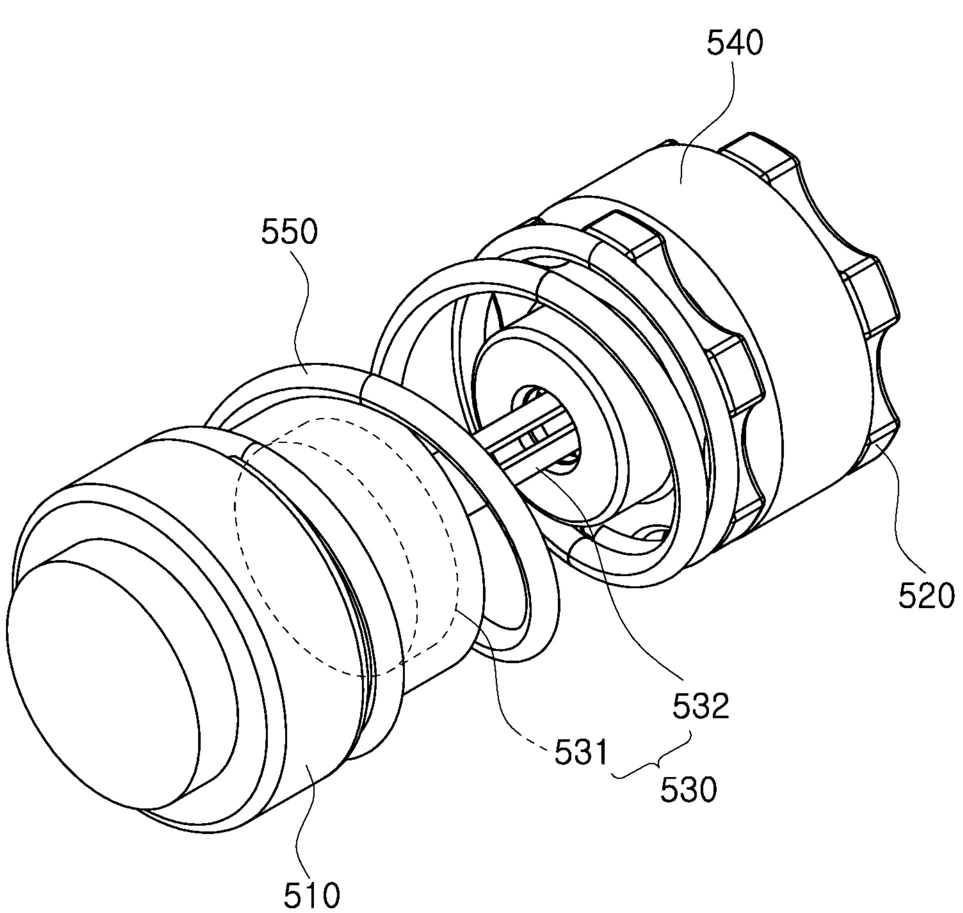
FIG. 5 is a perspective view illustrating a second damper unit of the pedal simulator of the vehicle according to the embodiment of the present disclosure.
Figure 6:
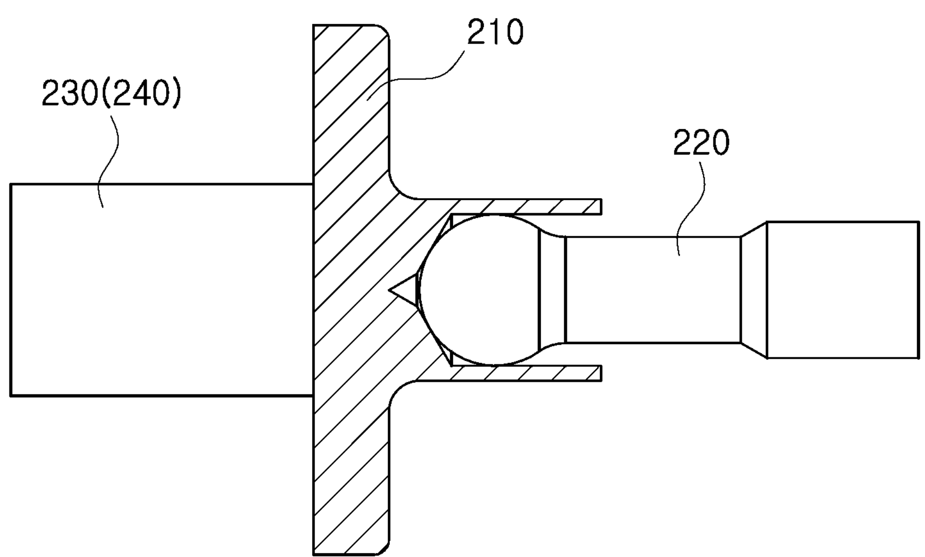
FIG. 6 and FIG. 7 are cross-sectional views illustrating a state in which a piston pressing unit is coupled to a piston body unit in the pedal simulator of the vehicle according to the embodiment of the present disclosure.
Figure 7:
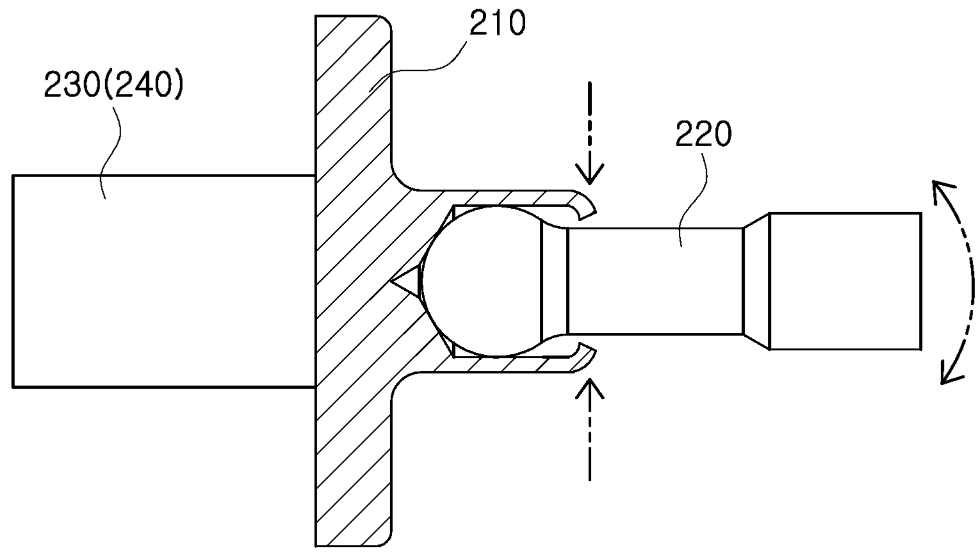

FIG. 1 is a perspective view illustrating a pedal simulator of a vehicle according to an embodiment of the present disclosure, FIG. 2 is an exploded perspective view of FIG. 1, FIG. 3 is a cross-sectional view of FIG. 1, FIG. 4 is a perspective view illustrating a piston unit of a pedal simulator of a vehicle according to an embodiment of the present disclosure, FIG. 5 is a perspective view illustrating a second damper unit of the pedal simulator of the vehicle according to an embodiment of the present disclosure, and FIGS. 6 and 7 are cross-sectional views illustrating a state in which a piston pressing unit is coupled to a piston body unit in the pedal simulator of the vehicle according to an embodiment of the present disclosure.

Referring to FIGS. 1 to 7, a pedal simulator 1 of a vehicle according to an embodiment of the present disclosure may include a housing unit 100, a piston unit 200, a rotation unit 300, and a first damper unit 400.

The housing unit 100 includes a first guide unit 110 and a second guide unit 120. The first guide unit 110 and the second guide unit 120 are provided inside the housing unit 100, respectively, and are formed in the shape of a hollow with a set length.

The first guide unit 110 guides a straight movement of a first piston rod unit 230 described later, and the second guide unit 120 guides a straight movement of a second piston rod unit 240 described later. An outer surface of the housing unit 100 is equipped with an opening communicating with the first guide unit 110 and the second guide unit 120, respectively. The first guide unit 110 may be formed as a cylindrical hole, and the second guide unit 120 may be formed as a cylindrical groove.

The piston unit 200 is disposed to be slidably movable in the housing unit 100.

The piston unit 200 may include the piston body unit 210, the piston pressing unit 220, the first piston rod unit 230, and the second piston rod unit 240.

The piston body unit 210 is located outside the housing unit 100 and is placed opposite the opening formed in the housing unit 100. The piston body unit 210 may be formed in a flat plate and a rod shape protruding from the flat plate. The rod shape of the piston body unit 210 is formed in the shape of a hollow shape in such a manner the piston pressing unit 220 may be mounted.

The piston pressing unit 220 is mounted on the rod shape on a first side of the piston body unit 210 (right side of FIG. 3). When the piston pressing unit 220 is pressed by an external force, the piston pressing unit 220 is moved to left side (left side of FIG. 3).

The piston pressing unit 220 may be coupled to the piston body unit 210 in a joint manner so as to be rotatable. In addition, the piston pressing unit 220 may be caulked to the piston body unit 210. In addition, by pressing and caulking both sides of the piston body unit 210 toward the piston pressing unit 220, the piston pressing unit 220 moved by an external force can be kept rotatably coupled in the rod shape of the piston body unit 210. In addition, the piston pressing unit 220 is caulked to the piston body unit 210 to reduce assembly time and cost.

The first piston rod unit 230 is provided on a second side of the piston body unit 210 (left side of FIG. 4) and pressurizes any of the plurality of first damper units 400 described later. The first piston rod unit 230 slides inside the first guide unit 110. The diameter of the first guide unit 110 is formed greater than the diameter of the first piston rod unit 230.

The second piston rod unit 240 is provided on the second side of the piston body unit 210 (left side as of FIG. 4) and is disposed to be spaced apart from the first piston rod unit 230. The second piston rod unit 240 presses a second damper unit 500 to be described later. The second piston rod unit 240 slides inside the second guide unit 120. The diameter of the second guide unit 120 is formed larger than the diameter of the second piston rod unit 240.

The first piston rod unit 230 and the second piston rod unit 240 may be formed in the shape of a cylindrical with a set length, respectively. The first piston rod unit 230 and the second piston rod unit 240 may be formed to have different lengths. The first piston rod unit 230 and the second piston rod unit 240 are disposed in parallel to be spaced apart on the second side of the piston body unit 210 and pressurize the first damper unit 400 and the second damper unit 500, respectively.

The first piston rod unit 230 and the second piston rod unit 240 are formed in different lengths, and time and length of contact with the first damper unit 400 and the second damper unit 500 are different, respectively, and thus a braking feeling felt by the user is different, so that it is possible to provide an early and mid-term braking feeling and a late-term braking feeling.

A length L1 of the first piston rod unit 230 is formed longer than a length L2 of the second piston rod unit 240.

The first piston rod unit 230 presses the first damper unit 400, and the second piston rod unit 240 presses the second damper unit 500.

Since relatively, the second damper unit 500 protrudes more toward the piston unit 200 than the first damper unit 400, the second piston rod unit 240 provides the early and mid-term braking feeling to the user when pressing the second damper unit 500, the first piston rod unit 230 provides the later-term braking feeling to the user when the first damper unit 400 is pressed. The length L1 of the first piston rod unit 230 and the length L2 of the second piston rod unit 240 can be tuned in such a manner as to provide a suitable braking feeling for the user.

The rotation unit 300 is rotatably coupled to the housing unit 100. The rotation unit 300 may include a main body unit 310, a rotating shaft 320, and a rotating unit 330.

The main body unit 310 may have the shape of a gear in which teeth are formed on an outer periphery edge. The teeth are formed in a circumferential direction of the main body unit 310 along an outer periphery edge of the main body unit 310. The main body unit 310 penetrates the outer surface of the housing unit 100 and may be rotatably coupled to an inner side of the housing unit 100. In addition, a portion of the main body 310 is located inside the housing unit 100, and the remaining portion is exposed to the outside of the housing unit 100.

A plurality of groove units 311 are formed in the main body unit 310. The plurality of groove units 311 are formed to be depressed on an outer surface of the main body unit 310, respectively. The plurality of groove units 311 may be disposed to be spaced apart along the circumferential direction of the main body unit 310. A plurality of first damper units 400 are respectively accommodated inside the plurality of groove units 311.

The rotating shaft 320 is provided on both side surfaces of the main body unit 310, respectively. The rotating shaft 320 is formed at the center of the main body unit 310. The rotating shaft 320 is rotatably coupled to the inner surface of the housing unit 100. Accordingly, the main body unit 310 may be rotated with the rotating shaft 320 as an axis.

The plurality of groove units 311 may be disposed to be spaced apart from the center of the rotating shaft 320 at the same interval. Accordingly, the plurality of first damper units 400 are disposed at the same interval at the center of the rotating shaft 320, each of the plurality of first damper units 400 may be disposed to face the first piston rod unit 230.

The rotating unit 330 is for rotating the main body unit 310, and may have the shape of a gear in which the teeth are formed on the outer periphery edge. The teeth are formed in the circumferential direction of the rotating unit 330 along the outer periphery edge of the rotating unit 330. The rotating unit 330 is located outside the housing unit 100 and is coupled with the outer periphery edge of the main body unit 310. A motor shaft (not illustrated) is axially coupled to the center of the rotating unit 330, and a rotational power of a motor (not illustrated) is transmitted to the rotating unit 330. The motor is operated under the control of a control unit (not illustrated). Accordingly, when the rotating unit 330 rotates, the main body unit 310 engaged with the rotating unit 330 rotates.

The plurality of first damper units 400 are provided. The plurality of first damper units 400 are disposed inside the plurality of groove units 311 formed in the main body unit 310, respectively. The first damper unit 400 may be manufactured including an elastically deformable material and may be press-fitted to the inner surface of the groove unit 311. The first damper unit 400 may be press-fitted and coupled to the main body unit 310 to be easily assembled. The first damper unit 400 is the elastically deformable material and may include rubber, silicon, plastic, or the like.

The first damper unit 400 is disposed in parallel to be spaced apart from a second damper unit 500 to be described later. The first damper unit 400, located inside the housing unit 100, is disposed opposite the first piston rod unit 230 by a rotation of the main body 310. In addition, the first damper unit 400 facing the opening of the first guide unit 110 toward the inside of the housing unit 100 is compressed by a pressure of the first piston rod unit 230. A plurality of the first damper units 400 may have different hardness and may be formed to have different lengths. Alternatively, the plurality of the first damper units 400 may have different diameters, or may be formed in different sizes or shapes.

For example, when a user sets a driving mode of a vehicle to either eco mode, normal mode, sports mode, or SUV mode, the controller rotates the rotating unit 330 so that the first damper unit 400 suitable for the mode is placed opposite the first piston rod unit 230, allowing the user to feel the braking feeling of the set driving mode.

The pedal simulator 1 of a vehicle according to an embodiment of the present disclosure may further include the second damper unit 500.

The second damper unit 500 is accommodated inside the housing unit 100. The second damper unit 500 is compressed by the pressure of the piston unit 200.

The second damper unit 500 is disposed opposite the second piston rod unit 240 and accommodated inside the second guide unit 120. The second damper unit 500 is formed to protrude toward the piston unit 200 relative to the first damper unit 400.

The second damper unit 500 may include a damper body unit 510, a damper contact unit 520, a connection unit 530, a magnet unit 540, and an elastic unit 550.

The damper body unit 510 is coupled to an inner surface of the second guide unit 120. The damper body unit 510 may be fixed to the second guide unit 120 by bolting, bonding, and press fitting.

The damper contact unit 520 is disposed to be spaced apart from the damper body unit 510 and is in contact with the moving second piston rod unit 240. Until the damper contact unit 520 comes into contact with the second piston rod unit 240, a braking is invalid. After the damper contact unit 520 comes into contact with the second piston rod unit 240, the braking is valid.

A first side of the connection unit 530 (left side of FIG. 2) is movably mounted on the damper body unit 510 and a second side thereof (right side of FIG. 2) is mounted on the damper contact unit 520.

The connection unit 530 may include a connection block unit 531 and a connection rod unit 532.

The connection block unit 531 is movably mounted on the damper body unit 510. The connection block unit 531 may be moved in an inner space of the damper body unit 510 by the pressure of the second piston rod unit 240 transmitted through the connection rod unit 532. The connection block unit 531 may be manufactured to include a material such as rubber or plastic.

A first side of the connection rod unit 532 (left side of FIG. 2) is mounted on the connection block unit 531, and a second side (right side of FIG. 2) is formed in the shape of a rod mounted on the damper contact unit 520.

The magnet unit 540 is mounted on an outer surface of the damper body unit 510 and measures a location information of the second piston rod unit 240. The magnet unit 540 is a magnet equipped with magnetic force, and may transmit a pedal force or location information pressed by the second piston rod unit 240 to the control unit through a change in the magnetic field that changes while moving by the second piston rod unit 240.

A first side of the elastic unit 550 (left side of FIG. 2) is in contact with the damper body unit 510, a second side thereof (right side of FIG. 2) is in contact with the damper contact unit 520, the elastic unit 550 provides elasticity to the damper contact unit 520 moved by the second piston rod unit 240.

That is, the elastic unit 550 is interposed between the damper body unit 510 and the damper contact unit 520, and is compressed by the damper contact unit 520 moved by the second piston rod unit 240. The compressed elastic unit 550 provides elasticity (elastic resilience) to the damper contact unit 520, thereby returning the damper contact unit 520 to its original position. The elastic unit 550 may be a coil spring surrounding the outside of the connection rod unit 532.

An operation process of the pedal simulator of a vehicle according to an embodiment of the present disclosure having the above-described configuration will be described below.

Figure 8:
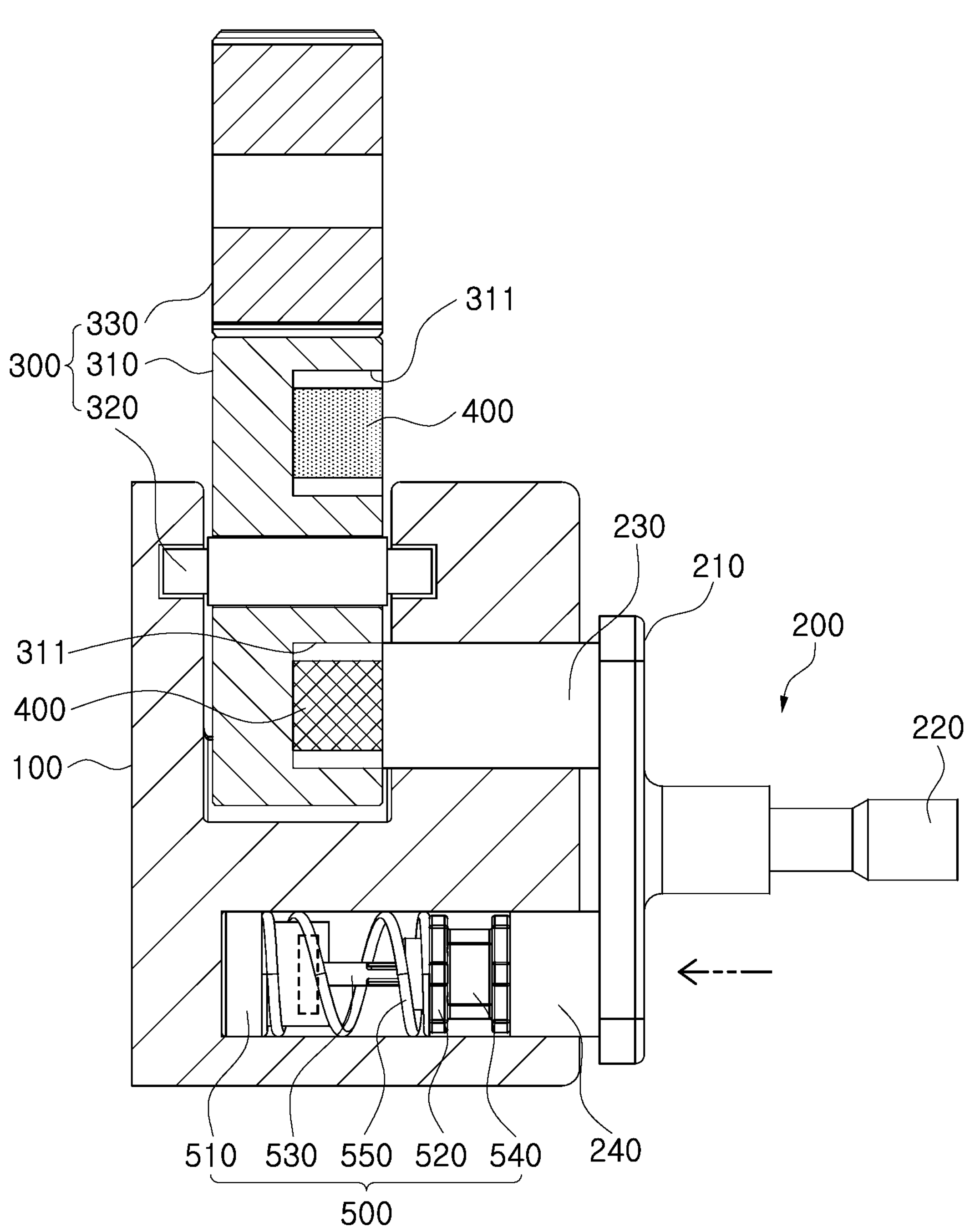
FIG. 8 is a cross-sectional view illustrating an early and mid-term braking of the pedal simulator of the vehicle according to the embodiment of the present disclosure.
Figure 9:
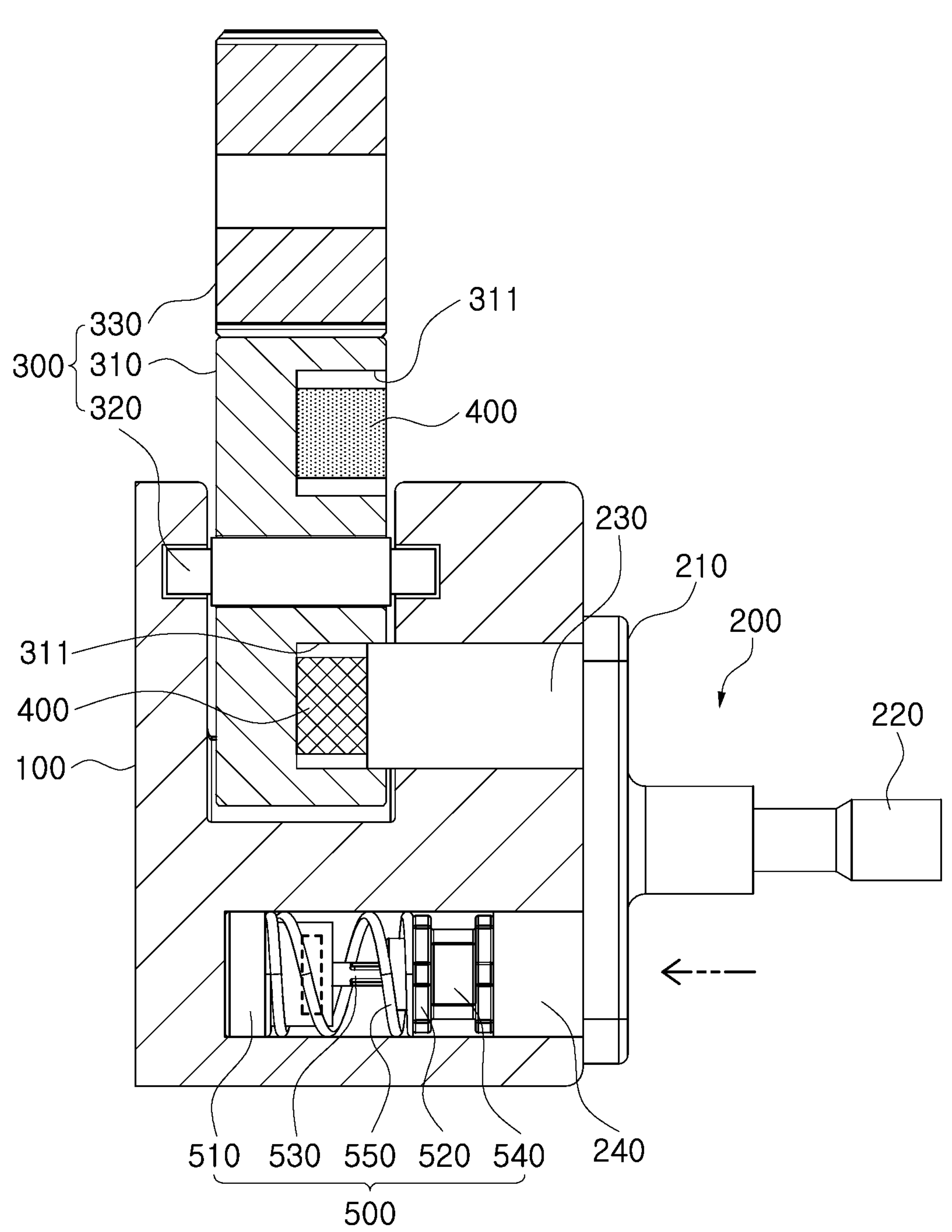
FIG. 9 is a cross-sectional view illustrating a late-term-braking of the pedal simulator of the vehicle according to the embodiment of the present disclosure.

FIG. 8 is a cross-sectional view illustrating an early and mid-term braking of the pedal simulator of a vehicle according to an embodiment of the present disclosure, and FIG. 9 is a cross-sectional view illustrating a late-term braking of the pedal simulator of the vehicle according to an embodiment of the present disclosure.

Referring to FIG. 8, when the piston pressing unit 220 is pressed, the first piston rod unit 230 and the second piston rod unit 240 are moved toward the first damper unit 400 and the second damper unit 500, respectively. At this time, the first piston rod unit 230 and the second piston rod unit 240 are moved along the first guide unit 110 and the second guide unit 120.

The second piston rod unit 240, which is formed shorter than the first piston rod unit 230, presses the damper contact unit 520. The user can feel an initial braking feeling when the second piston rod unit 240 presses the damper contact unit 520.

When the second piston rod unit 240 continuously presses the damper contact unit 520, the user can feel the medium-term braking feeling. In this case, the elastic unit 550 is compressed and deformed. The magnet unit 540 transmits location information or pedal force information of the second piston rod unit 240 according to changes in the magnetic field to the control unit (not illustrated) while moving by the second piston rod unit 240.

Referring to FIG. 9, when the first piston rod unit 230 is disposed in parallel with the second piston rod unit 240 and a relatively longer first piston rod unit 230 presses the first damper unit 400, the user can feel the late-term braking feeling. At this time, the compressed elastic unit 550 provides elastic force (elastic resilience) to the damper contact unit 520, thereby returning the damper contact unit 520 to its original position.

The pedal simulator 1 of the vehicle according to the embodiment of the present disclosure can rotate the plurality of the second damper units 500, thereby implementing various braking feelings in a single pedal simulator 1.

The pedal simulator 1 of the vehicle according to the embodiment of the present disclosure can be tuned so that the first piston rod unit 230 and the second piston rod unit 240 are formed in different lengths in such a manner as to feel the early and mid-term and the late-term braking feeling suitable for the user.

The pedal simulator 1 of the vehicle according to the embodiment of the present disclosure can reduce volume of the housing unit 100 through a parallel structure of the first piston rod unit 230, the second piston rod unit 240, and the first damper unit 400 and the second damper unit 500.

Although exemplary embodiments of the disclosure have been disclosed for illustrative purposes, those skilled in the art will appreciate that various modifications, additions and substitutions are possible, without departing from the scope and spirit of the disclosure as defined in the accompanying Thus, the true technical scope of the disclosure should be defined by the following claims.

What is claimed is:

1. A pedal simulator apparatus of a vehicle, the pedal simulator apparatus comprising:
- a housing unit;
- a piston unit slidably mounted on the housing unit;
- a rotation unit rotatably coupled to the housing unit; and
- a plurality of first damper units disposed in the rotation unit and configured to be compressed by a pressure of the piston unit inside the housing unit.

2. The pedal simulator apparatus of claim 1, further comprising:
- a second damper unit accommodated inside the housing unit, disposed to be spaced apart from the plurality of first damper units, and configured to be compressed by the pressure of the piston unit.

3. The pedal simulator apparatus of claim 2, wherein the piston unit comprises:
- a piston body unit located outside the housing unit;
- a piston pressing unit provided on a first side of the piston body unit;
- a first piston rod unit provided on a second side of the piston body unit and configured for pressing one of the plurality of the first damper units; and
- a second piston rod unit provided on the second side of the piston body unit, disposed to be spaced apart from the first piston rod unit, and configured for pressing the second damper unit.

4. The pedal simulator apparatus of claim 3, wherein the piston pressing unit is rotatably coupled to the piston body unit.

5. The pedal simulator apparatus of claim 3, wherein the first piston rod unit and the second piston rod unit are formed in different lengths.

6. The pedal simulator apparatus of claim 3,
- wherein the plurality of first damper units located inside the housing unit are disposed opposite the first piston rod unit, and
- wherein the second damper unit is disposed opposite the second piston rod unit.

7. The pedal simulator apparatus of claim 6, wherein the second damper unit comprises:
- a damper body unit mounted on the housing unit;
- a damper contact unit disposed to be spaced apart from the damper body unit and being in contact with the second piston rod unit;
- a connection unit which a first side thereof is movably mounted on the damper body unit, and a second side thereof is mounted on the damper contact unit; and
- an elastic unit which a first side thereof is in contact with the damper body unit and a second side thereof is in contact with the damper contact unit, wherein the elastic unit provides elasticity to the damper contact unit moved by the second piston rod unit.

8. The pedal simulator apparatus of claim 7, further includes a magnet unit mounted on the damper body unit and configured for measuring location information of the second piston rod unit.

9. The pedal simulator apparatus of claim 7, wherein until the damper contact unit comes into contact with the second piston rod unit, a braking is invalid and after the damper contact unit comes into contact with the second piston rod unit, the braking is valid.

10. The pedal simulator apparatus of claim 7, wherein the connection unit comprises:

a connection block unit movably mounted on the damper body unit; and a connection rod unit which a first side thereof is mounted on the connection block unit, and a second side thereof is mounted on the damper contact unit.

11. The pedal simulator apparatus of claim 10, wherein the connection block unit moves in an inner space of the damper body unit by a pressure of the second piston rod unit transmitted through the connection rod unit.

12. The pedal simulator apparatus of claim 10, wherein the connection block unit include an elastic material or a plastic material.

13. The pedal simulator apparatus of claim 1, wherein the rotation unit comprises:

a main body unit equipped with a plurality of groove units formed by depression on an outer surface thereof to accommodate the plurality of the first damper units therein; and a rotating shaft provided on the outer surface of the main body unit and coupling to an inner side of the housing unit.

14. The pedal simulator apparatus of claim 13, further comprising:

a rotating unit located outside the housing unit, engaging with an outer periphery edge of the main body unit, and rotating the main body unit.

15. The pedal simulator apparatus of claim 13, wherein the plurality of groove units are disposed to be spaced apart along a circumferential direction of the main body unit.

16. The pedal simulator apparatus of claim 15, wherein the plurality of groove units are disposed to be spaced apart from the center of the rotating shaft at a same interval.

17. The pedal simulator apparatus of claim 13, wherein the plurality of the first damper units include an elastic material.

18. The pedal simulator apparatus of claim 17, wherein the plurality of the first damper units have different hardness.

19. The pedal simulator apparatus of claim 17, wherein the plurality of the first damper units are formed in different lengths.

* * * * *